US006303533B1

United States Patent
Grosch et al.

(10) Patent No.: US 6,303,533 B1
(45) Date of Patent: *Oct. 16, 2001

(54) PROCESS FOR PREPARING TWO-METAL CYANIDE CATALYSTS

(75) Inventors: Georg Heinrich Grosch, Bad Dürkheim; Harald Larbig, Ludwigshafen; Dieter Junge, Frankenthal; Daniella Geelen, Schoten; Peter de Vocht, Emblem; Gerd Hoeppner, Schwarzheide, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,601

(22) Filed: Mar. 5, 1998

(51) Int. Cl.⁷ .............................. B01J 31/18; C08G 65/10
(52) U.S. Cl. .................... 502/175; 502/152; 502/153; 502/154; 502/155; 502/156; 1/159; 1/175; 568/620; 568/607
(58) Field of Search ..................... 568/679, 615, 568/620, 607; 549/513; 502/152, 153, 154, 175; 528/409

(56) References Cited

U.S. PATENT DOCUMENTS

| 4,764,567 | 8/1988 | Ott . |
| 5,482,908 | 1/1996 | Le-Khac . |
| 5,525,565 | 6/1996 | Le-Khac . |
| 5,627,122 | 5/1997 | Le-Khac . |
| 5,714,639 | * 2/1998 | Bowman et al. ............... 568/620 |

* cited by examiner

Primary Examiner—Gary Geist
Assistant Examiner—Howard Owens
(74) Attorney, Agent, or Firm—Fernando A. Borrego

(57) ABSTRACT

A process for preparing double metal cyanide catalysts, comprising combining an aqueous solution of a metal salt of the formula $M^1_m(X)_n$, with an aqueous solution of a cyanometallic acid of the formula $H_aM^2(CN)_b(A)_c$, where one or both aqueous solutions may comprises at least one water-miscible organic ligand selected from the group consisting of alcohols, aldehydes, ketones, ethers, polyethers, esters, ureas, amides, nitriles or sulfides, if desired, combining the aqueous suspension thus obtained with at least one water-miscible organic ligand selected from the above-mentioned group, which ligand may be identical to or different from any previously added ligand, and separating the resulting two-metal cyanide complex from the suspension.

21 Claims, 1 Drawing Sheet

PROCESS FOR PREPARING TWO-METAL CYANIDE CATALYSTS

FIELD OF THE INVENTION

The present invention relates to a process for preparing two-metal cyanide catalysts which can be used for preparing polyether alcohols having a low content of unsaturated constituents.

BACKGROUND OF THE INVENTION

Polyether alcohols are used in large amounts for producing polyurethanes. Their preparation is usually carried out by catalytic addition of lower alkylene oxides, in particular ethylene oxide and propylene oxide, onto H-functional initiator substances. Catalysts used are usually basic metal hydroxides or salts, with potassium hydroxide having the greatest practical importance.

In the synthesis of polyether alcohols having long chains, as are used, in particular, for producing flexible polyurethane foams, as chain growth progresses it is associated with secondary reactions which lead to faults in the chain structure. These by-products are known as unsaturated constituents and lead to an impairment of the properties of the resulting polyurethanes. There have therefore been many attempts in the past to prepare polyether alcohols having a low content of unsaturated constituents. For this purpose, in particular, the alkoxylation catalysts used are altered in a targeted way. Thus, EP-A-268 922 proposes using cesium hydroxide. Although this can lower the content of unsaturated components, cesium hydroxide is expensive and presents a disposal problem.

Furthermore, the use of multimetal cyanide complexes, mostly zinc hexacyanometalates, for the preparation of polyether alcohols having low contents of unsaturated constituents is known. There is a large number of documents in which the preparation of such compounds is described. Thus, DD-A-203 735 and DD-A-203 734 describe the preparation of polyetherols using zinc hexacyanocobaltate.

The preparation of the zinc hexacyanometalates is also known. These catalysts are usually prepared by reacting solutions of metal salts such as zinc chloride with solutions of alkali metal or alkaline earth metal cyanometalates such as potassium hexacyanocobaltate. In general, immediately after the precipitation procedure, a water-miscible, heteroatom-containing component is added to the precipitation suspension obtained. This component can also be present beforehand in one or both starting solutions. This water-miscible, heteroatom-containing component can be, for example, an ether, polyether, alcohol, ketone or a mixture thereof. Such processes are described, for example, in U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,404,109, U.S. Pat. No. 3,829,505, U.S. Pat. No. 3,941,849, EP 283,148, EP 385,619, EP 654,302, EP 659,798, EP 665,254, EP 743,093, U.S. Pat. No. 4,843,054, U.S. Pat. No. 4,877,906, U.S. Pat. No. 5,158,922, U.S. Pat. No. 5,426,081, U.S. Pat. No. 5,470,813, U.S. Pat. No. 5,482,908, U.S. Pat. No. 5,498,583, U.S. Pat. No. 5,523,386, U.S. Pat. No. 5,525,565, U.S. Pat. No. 5,545,601, JP 7,308, 583, JP 6,248,068, JP 4,351,632 and U.S. Pat. No. 5,545, 601.

DD-A-148 957 describes the preparation of zinc hexacyanoiridate and its use as a catalyst in the preparation of polyether alcohols. One of the starting materials used here is hexacyanoiridic acid. This acid is isolated as a solid and is used in this form.

A disadvantage of using zinc hexacyanoiridate is its color. The polyether alcohols prepared using this catalyst are usually also slightly yellowish, which for many applications is regarded as a quality defect.

Furthermore, this process cannot be applied to the preparation of other two-metal cyanide complexes, in particular the substantially less expensive cyanocobaltates, since cyanocobaltic acid is substantially less stable and is virtually impossible to handle as a solid.

A disadvantage of processes starting from cyanometalate salts is that they form not only the desired multimetal cyanide complex catalyst but also an unavoidable amount of salt, eg. potassium chloride when zinc chloride and potassium hexacyanocobaltate are used, which has to be removed from the catalyst in order to achieve a high activity. Since the addition of the organic components to the precipitation suspension considerably reduces the solubility of the salts to be removed, the generally very finely divided catalyst has to be washed a number of times with the organic component. In the production of multimetal cyanide complex catalysts, this takes a considerable amount of time and leads to losses of solid, which can be prohibitive for the industrial preparation of such catalysts.

It is an object of the present invention to find a process for preparing multimetal cyanide complex catalysts which does not produce an additional amount of solid and is thus simpler to carry out and leads to catalysts having a high activity.

SUMMARY OF THE INVENTION

We have found that this object is achieved by reacting metal salts, in particular metal carboxylates, with cyanometalic acids, in particular cyanocobaltic acid, to form multimetal cyanide complex catalysts.

The present invention accordingly provides a process for preparing multimetal cyanide complex salts by reacting metal salts, in particular metal carboxylates, with cyanometalic acid, and the salts prepared by this process and also provides for their use as catalysts in the preparation of polyethers, in particular polyetherols, by polymerization of lower alkylene oxides.

The process of the present invention is divided into the following process steps:

a) Adding an aqueous solution of a water-soluble metal salt of the formula $M^1{}_m(X)_n$, where $M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$, X is an anion selected from the group consisting of halide, hydroxide, sulfate, carbonate, cyanide, thiocyanate, isocyanate, carboxylate, oxalate and nitrate and m and n are integers which satisfy the valences of $M^1$ and X, to an aqueous solution of a cyanometalate compound of the formula $H_aM^2(CN)_b(A)_c$, where $M^2$ is a metal ion selected from the group consisting of $Fe^{2+}$, $Fe^{3+}$, $Co^{3+}$, $Cr^{3+}$, $Mn^{2+}$, $Mn^{3+}$, $Rh^{3+}$, $RU^{2+}$, $V^{4+}$, $V^{5+}$, $Co^{2+}$ and $Cr^{2+}$ and $M^2$ can be identical to or different from $M^1$, H is hydrogen, A is an anion selected from the group consisting of halide, hydroxide, sulfate, carbonate, cyanate, thiocyanate, isocyanate, carboxylate, nitrate and in particular cyanide, where A can be identical to or different from X, and a, b and c are integers which are selected so as to make the cyanide compound electrically neutral where one or both solutions may, if desired, comprise at least one water-miscible, heteroatom-containing ligand which is selected from the group consisting of alcohols, aldehydes, ketones, ethers, polyethers, esters, ureas, amides, nitrites and sulfides, b) combining the aqueous suspension formed in step a) with a water-miscible, heteroatom-containing ligand which is selected from the group described above and may be identical to or different from the ligand in step a), and c) separating the multimetal cyanide compound from the suspension.

$M^1$ is preferably selected from the group consisting of $Zn^{2+}$, $Fe^{2+}$, $Co^{2+}$ and $Ni^{2+}$; particular preference is given to using $Zn^{2+}$.

X is preferably carboxylate, halide, oxalate or nitrate, in particular carboxylate.

$M^2$ is preferably $Co^{2+}$, $Co^{3+}$, $Fe^{2+}$, $Fe^{3+}$, $Cr^{3+}$, $Rh^{3+}$ or $Ni^{2+}$, in particular $Co^{3+}$.

BRIEF DESCRIPTION OF THE DRAWING

The cyanometalic acids which can be used according to the present invention are stable and easy-to-handle in aqueous solution. They can be prepared, for example, as described in W. Klemm, W. Brandt, R. Hoppe, Z. Anorg. Allg. Chem. 308 (1961), 179, starting from alkali metal cyanometalate via the silver cyanometalate to give the cyanometalic acid. A further possibility is to convert an alkali metal or alkaline earth metal cyanometalate into a cyanometalic acid by means of an acid ion exchanger, as described, for example, in F. Hein, H. Lilie, Z. Anorg. Allg. Chem. 270 (1952), 45, or A. Ludi, H.U. Gudel, V. Dvorak, Helv. Chim. Acta 50 (1967), 2035. Further possible ways of synthesizing the cyanometalic acids may be found, for example, in "Handbuch der Präparativen Anorganischen Chemie", G. Bauer (Editor), Ferdinand Enke Verlag, Stuttgart, 1981. For the industrial preparation of these compounds, as is necessary for the process of the present invention, the synthesis via ion exchangers is the most advantageous route. The cyanometalic acid solutions can be processed further immediately after the synthesis, but it is also possible to store them for a relatively long period. Such storage should be in the absence of light in order to prevent decomposition of the acid.

The proportion of the acid in the solution should be greater than 80% by weight, based on the total mass of cyanometalate complexes, preferably greater than 90% by weight, in particular greater than 95% by weight.

Figure 1:
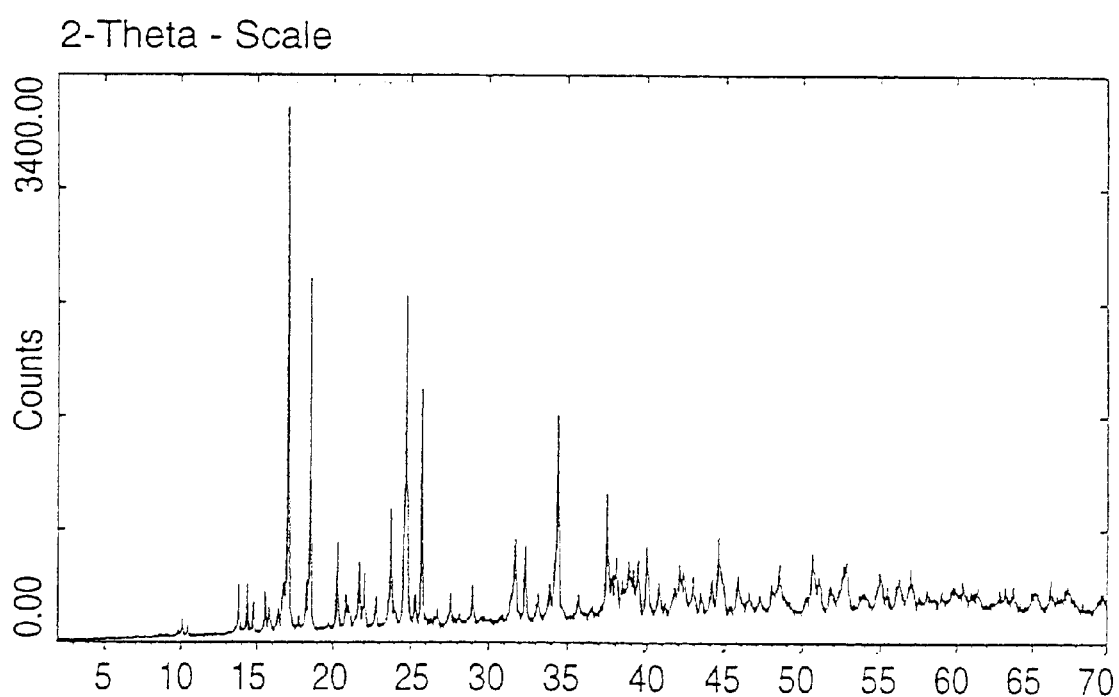

Heteroatom-containing ligands used are organic substances which are miscible with water. For the purposes of the present invention, heteroatoms are non-carbon atoms, in particular oxygen, sulfur and nitrogen, which are built into the carbon chain. Ligands which are preferably used are alcohols, aldehydes, ketones, ethers, polyethers, esters, polyesters, ureas, amides, nitriles and sulfides, preferably alcohols, ketones, ethers, polyethers or mixtures thereof, particularly preferably alcohols, ethers, polyethers and mixtures thereof.

To carry out the process of the present invention, an aqueous solution of a cyanometalic acid is combined with the aqueous solution of a metal salt of the formula $M^1{}_m(X)_n$, where the symbols are as defined above. A stoichiometric excess of the metal salt is employed here. Preference is given to using a molar ratio of the metal ion to the cyanometalate component of from 1.6 to 7.0, preferably from 1.6 to 5.0 and particularly preferably from 1.7 to 3.0. It is advantageous to place the solution of the cyanometalic acid in the reaction vessel first and then add the metal salt solution, but the reverse procedure can also be used. Good mixing, for example by stirring, is necessary during and after the combining of the starting solutions.

The content of cyanometalic acid in the solution is from 0.1 to 30% by weight, preferably from 1 to 20% by weight, in particular from 2 to 10% by weight, and the content of the metal salt component in the solution is from 1 to 50% by weight, preferably from 2 to 40% by weight, in particular from 5 to 30% by weight.

The heteroatom-containing ligands are, in particular, added to the suspension formed after combining the two starting solutions; here too, good mixing is necessary.

However, it is also possible to add some or all of the ligand to one or both of the starting solutions. In this case, owing to the change in the salt solubilities, the ligand should preferably be added to the cyanometalic acid solution.

The content of the ligands in the suspension should be from 1 to 60% by weight, preferably from 5 to 40% by weight, in particular from 10 to 30% by weight.

After addition of the ligands, the resulting two-metal cyanide complexes are separated from the aqueous phase. This can be carried out by customary and known separation methods, for example by filtration or centrifugation.

The mixing of the starting materials can be carried out at from 10 to 80° C., preferably from 15 to 60° C., particularly preferably from 20 to 50° C.

The multimetal cyanide complexes are then dried. Drying can be carried out at room temperature and atmospheric pressure, but preference is given to drying at from 20 to 60° C. under a pressure of from 0.01 to 1 bar. Particular preference is given to temperatures of from 20 to 50° C. and pressures of from 0.05 to 0.7 bar.

After the catalysts have been separated off and dried, they can be treated again with the aqueous solution of the ligands, separated off and dried.

The multimetal cyanide complexes prepared by the process of the present invention can be used, in particular, as catalysts in the preparation of polyetherols by polymerization of lower alkylene oxides, in particular ethylene oxide and/or propylene oxide; these polyetherols have a significantly reduced proportion of unsaturated components compared with those produced using other catalysts.

The process of the present invention has advantages over the preparation of the multimetal cyanide complex catalysts by the process of the prior art in which the metal salts are reacted with cyanometalate salts. Thus, no additional salt which has to be removed from the catalyst is formed from the cation of the cyanometalate salt and the anion of the metal salt. In this way, the number of times the product is washed can be significantly reduced and the preparative process can be configured more effectively. Owing to the reduced content of catalytically inactive contaminants, the catalysts prepared by the process of the present invention are more active than those of the prior art. Owing to their high activity, they can be used in amounts of less than 0.5% by weight, preferably less than 500 ppm, particularly preferably less than 250 ppm, based on the weight of the polyether alcohols.

The catalysts prepared according to the present invention have, in contrast to those of the prior art, in particular those as described in EP-A-654 302 and EP-A-743 093, a high proportion of crystalline regions. They are nevertheless highly active and have a very low incubation time. The differences in the structure are possibly related to the difference in the pH of the reaction mixture during the preparation of the catalysts owing to the use of the cyanometalic acid.

The invention is illustrated by the examples below.

EXAMPLE 1

200 ml of the strong acid ion exchanger K 2431 from Bayer AG were regenerated using 80 g of 37% strength hydrochloric acid and washed with water until the washings were neutral. A solution of 17.8 g of potassium hexacyanocobaltate in 100 ml of water was then introduced onto the exchanger column. The column was then eluted until the eluate was neutral again. The 368 g of eluate obtained in this way were heated to 40° C. and, while stirring, a solution of 20.0 g of zinc acetate in 100 ml of water was added. The resulting suspension was stirred further for 10 minutes at 40° C. 84 g of ethylene glycol dimethyl ether were then added and the solution was stirred further for 30 minutes at 40° C. The solid was then filtered off with suction and washed on the filter with 300 ml of ethylene glycol dimethyl ether. The solid which had been treated in this way was dried at room temperature and the potassium content was determined by means of atomic absorption spectroscopy. No potassium could be detected (detection limit: 10 ppm).

FIG. 1 shows the X-ray diffraction pattern of the solid obtained. The diffraction pattern was recorded by means of a Siemens D 5000 diffractometer (Cu-$K_\alpha$ radiation).

The good crystallinity of the sample can be seen from the diffraction pattern.

EXAMPLE 2

200 ml of the ion exchanger described in Example 1 were regenerated using two x80 g of 37% strength hydrochloric acid as described in Example 1. A solution of 16.8 g of potassium hexacyanocobaltate in 100 ml of water was then introduced onto the exchanger column and the column was then eluted until the eluate was neutral. The resulting 352 g of eluate were heated to 40° C., admixed with 42 g of ethylene glycol dimethyl ether and, while stirring, a solution of 20 g of zinc acetate in 70 ml of water was added thereto. The resulting suspension was stirred further for 10 minutes at 40° C. 42 g of ethylene glycol dimethyl ether were then added and the suspension was stirred further for 30 minutes at 40° C. The solid was then filtered off with suction and washed on the filter with 300 ml of ethylene glycol dimethyl ether. The solid which had been treated in this way was dried at room temperature and the potassium content was determined by means of atomic absorption spectroscopy. No potassium could be detected (detection limit: 10 ppm).

COMPARATIVE EXAMPLE 1

6.5 g of potassium hexacyanocobaltate dissolved in 130 ml of water were heated to 40° C. While stirring a solution of 13.3 g of zinc chloride in 15 g of water was added thereto. The resulting suspension was stirred at 40° C. for 15 minutes, 42.0 g of ethylene glycol dimethyl ether were then added thereto and the suspension was stirred further for 30 minutes at 40° C. The solid was then filtered off with suction, washed on the filter with 150 ml of ethylene glycol dimethyl ether and dried at room temperature. The solid thus obtained was analyzed for potassium and chloride. The potassium content was 0.62% by weight and the chloride content was 6.4% by weight.

COMPARATIVE EXAMPLE 2

6.5 g of potassium hexacyanocobaltate dissolved in a mixture of 130 ml of water and 21.0 g of ethylene glycol dimethyl ether were heated to 40° C. While stirring, a solution of 13.3 g of zinc chloride in 15 g of water was added thereto. The resulting suspension was stirred at 40° C. for 15 minutes, the remaining 21.0 g of ethylene glycol dimethyl ether were then added thereto and the suspension was stirred further for 30 minutes at 40° C. The solid was then filtered off with suction, washed on the filter with 150 ml of ethylene glycol dimethyl ether and dried at room temperature. The solid thus obtained was analyzed for potassium and chloride. The potassium content was 2.1% by weight and the chloride content was 9.3% by weight.

Synthesis of Polyether Polyols

In the following examples, an oligopropylene glycol which had been obtained by alkali-catalyzed reaction of dipropylene glycol with propylene oxide at 105° C. was used as initiator. This oligopropylene glycol was freed of the catalyst by means of a magnesium silicate. It had a hydroxyl number of 280 mg KOH/g, a content of unsaturated constituents of 0.003 meq/g and a sodium and potassium content of less than 1 ppm.

The hydroxyl number was determined in accordance with ASTM D 2849, the unsaturated constituents were determined in accordance with ASTM 4671 and the metal contents were determined by means of atomic absorption spectroscopy.

EXAMPLE 3

509 g of the oligopropylene glycol were mixed with 1.25 g of the catalyst from Example 1 (corresponding to 500 ppm based on the finished product) in a stirring autoclave under a nitrogen atmosphere. After evacuating the reactor, 150 g of propylene oxide were metered in at 105° C. The almost immediate starting of the reaction was recognized by an only brief pressure rise to 2.5 bar followed by an immediate drop in pressure. After 10 minutes, no free propylene oxide was present in the reactor. At the same temperature, 1824 g of propylene oxide were then fed in in such a way that a pressure of 2.6 bar abs. was not exceeded. The metering-in phase was complete after only 30 minutes and after a further 4 minutes the after-reaction phase was complete, as could be seen from the pressure signal.

The polyetherol thus obtained was filtered once using a deep-bed filter. The polyol had a hydroxyl number of 56.6 mg KOH/g, a content of unsaturated constituents of 0.0074 meq/g, a zinc content of 30 ppm and a cobalt content of 14 ppm.

EXAMPLE 4

512 g of the oligopropylene glycol were mixed with 0.25 g of the catalyst from Example 1 (corresponding to 100 ppm based on the finished product) in a stirring autoclave under a nitrogen atmosphere. After evacuating the reactor, 150 g of propylene oxide were metered in at 105° C. The starting of the reaction was recognized by the pressure, which was at first 2.7 bar after the metering-in of alkylene oxide, beginning to drop after about 30 minutes. After the propylene oxide had reacted completely, a further 1844 g of propylene oxide were fed in at the same temperature in such a way that a pressure of 2.8 bar was not exceeded. The metering-in phase was complete after only 35 minutes and after a further 10 minutes the after-reaction phase was complete, as could be seen from the pressure signal.

The polyetherol thus obtained was filtered once. It had a hydroxyl number of 57.3 mg KOH/g, a content of unsaturated constituents of 0.0103 meq/g, a zinc content of less than 5 ppm and a cobalt content of less than 5 ppm.

EXAMPLE 5

521 g of the oligopropylene glycol were mixed with 0.50 g of the catalyst from Example 2 (corresponding to 200 ppm based on the finished product) in a stirring autoclave under a nitrogen atmosphere. After evacuating the reactor, 150 g of propylene oxide were metered in at 105° C. The starting of the reaction was recognized by the pressure, which was at first 2.7 bar abs. after the metering in of alkylene oxide, beginning to drop after 20 minutes. After the propylene oxide had reacted completely, a further 1990 g of propylene oxide were fed in at the same temperature in such a way that a pressure of 5.3 bar was not exceeded. After 60 minutes, the metering-in phase was complete.

COMPARATIVE EXAMPLE 3

512 g of the oligopropylene glycol were mixed with 0.25 g of the catalyst from Comparative Example 1 (corresponding to 100 ppm based on the desired finished product) in a stirring autoclave under a nitrogen atmosphere. After evacuating the reactor, 150 g of propylene oxide were metered in at 105° C. The starting of the reaction was recognized by the pressure of 2.9 bar beginning to drop after 40 minutes. The pressure dropped only slowly. After the propylene oxide had reacted completely, the metering-in of a further 1851 g of propylene oxide was commenced at the same temperature. During the metering-in of propylene oxide, a pressure rise to an initial 4.1 bar abs. was observed; the pressure later rose further to 4.5 bar abs. and did not drop again after metering-in was complete. Due to the reaction stopping before it was complete, unreacted propylene oxide had to be removed from the reaction mixture.

The polyetherol obtained was filtered once. It had a hydroxyl number of 68.6 mg KOH/g, a content of unsaturated constituents of 0.0128 meq/g, a zinc content of 24 ppm and a cobalt content of 11 ppm.

COMPARATIVE EXAMPLE 4

512 g of the oligopropylene glycol were mixed with 0.5 g of the catalyst from Comparative Example 2 (corresponding to 200 ppm based on the desired finished product) in a stirring autoclave under a nitrogen atmosphere. After evacuating the reactor, 150 g of propylene oxide were metered in at 105° C. A drop in pressure was observed only after about 60 minutes and occurred only slowly. After the propylene oxide had reacted completely, metering-in of propylene oxide at the same temperature was commenced. A distinct pressure rise was observed while metering-in the propylene oxide and the pressure did not drop again after interrupting the monomer feed. Due to the reaction stopping before it was complete, unreacted propylene oxide had to be removed from the reaction mixture.

We claim:

1. A process for preparing two-metal cyanide catalysts, which comprises combining an aqueous solution for a metal salt of the formula $M^1{}_m(X)_n$, where $M^1$ is a metal ion selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cr(II), and Cr(III), X is an anion selected from the group consisting of halide, hydroxide, sulfate, carbonate, cyanate, thiocyanate, isocyanate, carboxylate, oxalate and nitrate; and m and n are derived from the valences of $M^1$ and X, with an aqueous solution of a cyanometalic acid of the formula $H_aM^2(CN)_b(A)_c$, where $M^2$ is a metal ion selected from the group consisting of Fe(II), Fe(III), Co(III), Cr(III), Mn(II), Mn(III), Rh(III), Ru(II), V(IV), V(V), Co(II), and Cr(II), where $M^2$ can be identical to or different from $M^1$, H is a hydrogen atom, A is an anion selected from the group consisting of halide, hydroxide, sulfate, carbonate, cyanide, thiocyanate, isocyanate, cyanate, carboxylate, oxalate and nitrate, where A can be identical to or different from X, a, b and c are integers, and are selected such that the cyanide compound is electrically neutral, where one or both aqueous solutions may comprise at least one water-miscible organic ligand selected from the group consisting of alcohols, aldehydes, ketones, ethers, polyethers, esters, ureas, amides, nitriles and sulfides, and, optionally, combining the aqueous suspension thus obtained with a second water-miscible organic ligand selected from the group consisting of alcohols, aldehydes, ketones, ethers, polyethers, esters, ureas, amides, nitriles and sulfides, which second ligand may be identical to or different from the at least one water miscible organic ligand, and separating the resulting two-metal cyanide complex from the suspension.

2. A process as claimed in claim 1, wherein $M^1$ is selected from the group consisting of Zn(II), Fe(II), Co(II) and Ni(II).

3. A process as claimed in claim 1, wherein X is selected from the group consisting of carboxylate, halide, oxalate and nitrate.

4. A process as claimed in claim 1, wherein X is selected from the group consisting of acetate, oxalate, citrate and halide.

5. A process as claimed in claim 1, wherein $M^2$ is selected from the group consisting of Co(II), Co(III), Fe(II), Fe(III), Ni(II) and Cr(III).

6. A process as claimed in claim 1, wherein $M^2$ is Co(III).

7. A process as claimed in claim 1, wherein the water-miscible ligands used are oxygen-containing compounds.

8. A process as claimed in claim 1, wherein the water-miscible ligands used are alcohols, ethers, polyethers, ketones or mixtures thereof.

9. A process as claimed in claim 1, wherein the two-metal cyanide complex separated from the suspension is treated again with an aqueous solution of the ligand.

10. A process as claimed in claim 1, wherein the two-metal cyanide compound separated from the suspension is treated again with the pure ligand.

11. A process for preparing two-metal cyanide catalysts, which comprises the following steps:

a) providing an aqueous solution of a metal salt of the formula $M^1{}_m(X)_n$, where: $M^1$ is a metal ion selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cr(II), and Cr(III); X is an anion selected from the group consisting of halide, hydroxide, sulfate, carbonate, cyanate, thiocyanate, isocyanate, carboxylate, oxalate and nitrate; and m and n are derived from the valences of $M^1$ and X;

b) passing an alkali metal or an alkaline earth metal cyanometalate through an acid ion exchange column to form an aqueous solution of a cyanometalic acid of the formula $H_aM^2(CN)_b(A)_c$ where: $M^2$ is a metal ion selected from the group consisting of Fe(II), Fe(III), Co(III), Cr(III), Mn(II), Mn(III), Rh(III), Ru(II), V(IV), V(V), Co(II), and Cr(II); $M^2$ can be identical to or different from $M^1$; H is a hydrogen atom; A is an anion selected from the group consisting of halide, hydroxide, sulfate, carbonate, cyanide, thiocyanate, isocyanate, cyanate, carboxylate, oxalate and nitrate; where A can be identical to or different from X; a, b and c are integers, and are selected such that the cyanide compound is electrically neutral;

c) combining the aqueous solution of the metal salt of the formula $M^1_m(X)_n$ with the aqueous solution of the cyanometalic acid of the formula $H_aM^2(CN)_b(A)_c$, where one or both aqueous solutions may comprise at least one water-miscible organic ligand selected from the group consisting of alcohols, aldehydes, ketones, ethers, polyethers, esters, ureas, amides, nitrites and sulfides;

d) optionally, combining the aqueous suspension obtained in step c) with a second water-miscible organic ligand selected from the group consisting of alcohols, aldehydes, ketones, ethers, polyethers, esters, ureas, amides, nitrites and sulfides, which second ligand may be identical to or different from the at least one water miscible organic ligand; and e) separating the resulting two-metal cyanide complex from the suspension.

12. A process as claimed in claim 11, wherein $M^1$ is selected from the group consisting of Zn(II), Fe(II), Co(II) and Ni(II).

13. A process as claimed in claim 11, wherein X is selected from the group consisting of carboxylate, halide, oxalate and nitrate.

14. A process as claimed in claim 11, wherein X is selected from the group consisting of acetate, oxalate, citrate and halide.

15. A process as claimed in claim 11, wherein $M^2$ is selected from the group consisting of Co(II), Co(III), Fe(II), Fe(III), Ni(II) and Cr(III).

16. A process as claimed in claim 11, wherein $M^2$ is Co(III).

17. A process as claimed in claim 11, wherein the water-miscible ligands used are oxygen-containing compounds.

18. A process as claimed in claim 11, wherein the water-miscible ligands used are alcohols, ethers, polyethers, ketones or mixtures thereof.

19. A process as claimed in claim 11, wherein the two-metal cyanide complex separated from the suspension is treated again with an aqueous solution of the ligand.

20. A process as claimed in claim 11, wherein the two-metal cyanide compound separated from the suspension is treated again with the pure ligand.

21. A process for preparing two-metal cyanide catalysts, which comprises the following steps:

a) providing an aqueous solution of a metal salt of the formula $M^1_m(X)_n$, where: $M^1$ is a metal ion selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cr(II), and Cr(III); X is an anion selected from the group consisting of halide, hydroxide, sulfate, carbonate, cyanate, thiocyanate, isocyanate, carboxylate, oxalate and nitrate; and m and n are derived from the valences of $M^1$ and X;

b) converting an alkali metal cyanometalate to its corresponding silver cyanometalate and then converting the formed silver cyanometalate into a cyanometalic acid of the formula $H_aM^2(CN)_b(A)_c$ where: $M^2$ is a metal ion selected from the group consisting of Fe(II), Fe(III), Co(III), Cr(III), Mn(II), Mn(III), Rh(III), Ru(II), V(IV), V(V), Co(II), and Cr(II); $M^2$ can be identical to or different from $M^1$; H is a hydrogen atom; A is an anion selected from the group consisting of halide, hydroxide, sulfate, carbonate, cyanide, thiocyanate, isocyanate, cyanate, carboxylate, oxalate and nitrate; where A can be identical to or different from X; a, b and c are integers, and are selected such that the cyanide compound is electrically neutral;

c) combining the aqueous solution of the metal salt of the formula $M^1_m(X)_n$ with an aqueous solution of the cyanometalic acid of the formula $H_aM^2(CN)_b(A)_c$, where one or both aqueous solutions may comprise at least one water-miscible organic ligand selected from the group consisting of alcohols, aldehydes, ketones, ethers, polyethers, esters, ureas, amides, nitriles and sulfides;

d) optionally, combining the aqueous suspension obtained in step c) with a second water-miscible organic ligand selected from the group consisting of alcohols, aldehydes, ketones, ethers, polyethers, esters, ureas, amides, nitriles and sulfides, which second ligand may be identical to or different from the at least one water miscible organic ligand; and e) separating the resulting two-metal cyanide complex from the suspension.

* * * * *